US009117178B1

(12) United States Patent
Chiu et al.

(10) Patent No.: US 9,117,178 B1
(45) Date of Patent: Aug. 25, 2015

(54) SYSTEM FOR ASSISTING CREATION OF MESSAGES BY AUTOMATICALLY RECOMMENDING DATA TO BE INCLUDED THEREIN

(71) Applicants: Kwan-Min Chiu, Fremont, CA (US); Daniel-Augustin Grad, Sunnyvale, CA (US); Nidhi Gupta, Los Altos, CA (US)

(72) Inventors: Kwan-Min Chiu, Fremont, CA (US); Daniel-Augustin Grad, Sunnyvale, CA (US); Nidhi Gupta, Los Altos, CA (US)

(73) Assignee: Elance, Inc., Mountain View, CA (US)

( * ) Notice: Subject to any disclaimer, the term of this patent is extended or adjusted under 35 U.S.C. 154(b) by 207 days.

(21) Appl. No.: 13/652,378

(22) Filed: Oct. 15, 2012

(51) Int. Cl.
*G06F 15/18* (2006.01)
*G06F 17/30* (2006.01)
*G06N 99/00* (2010.01)
*G06F 17/18* (2006.01)

(52) U.S. Cl.
CPC .............. *G06N 99/005* (2013.01); *G06F 15/18* (2013.01); *G06F 17/18* (2013.01); *G06F 17/30* (2013.01)

(58) Field of Classification Search
None
See application file for complete search history.

(56) References Cited

U.S. PATENT DOCUMENTS

| 8,626,769 | B1 * | 1/2014 | Bhatt | 707/740 |
|---|---|---|---|---|
| 8,645,817 | B1 | 2/2014 | Fisher | |
| 2002/0035487 | A1 | 3/2002 | Brummel et al. | |
| 2005/0257148 | A1 * | 11/2005 | Goodman et al. | 715/534 |
| 2007/0054248 | A1 * | 3/2007 | Bare | 434/219 |
| 2011/0209068 | A1 * | 8/2011 | Vemuri | 715/738 |
| 2013/0061119 | A1 | 3/2013 | Jackson | |
| 2013/0268451 | A1 | 10/2013 | Pendyala et al. | |

OTHER PUBLICATIONS

Ali, A. et al. Predictive models of form filling. Microsoft Research, Tech. Rep. MSR-TR-2009-1, 2009.*
Toda, G., et al. "A probabilistic approach for automatically filling form-based web interfaces." Proceedings of the VLDB Endowment 4.3 (2010): 151-160.*
Office Action mailed on Nov. 19, 2014, U.S. Appl. No. 13/652,357, filed Oct. 15, 2012, Nidhi Gupta et al.

* cited by examiner

*Primary Examiner* — Kakali Chaki
*Assistant Examiner* — Eric Nilsson
(74) *Attorney, Agent, or Firm* — Haverstock & Owens LLP

(57) ABSTRACT

Embodiments of the present invention are directed to a system for assisting creation of messages, by automatically recommending data to be included therein. The system includes an application configured to accept a set of user inputs of a first classification to determine and provide a group of suggested data relevant to the set of user inputs of the first classification. The group of data is chosen from an evolving collection of data of a second classification. The user is able to select any or all from the group of suggested data to adopt as the user's own and/or to provide additional or different data, which are of the second classification. The user inputs and the user's selection(s) are values collected for use in subsequent determinations.

22 Claims, 4 Drawing Sheets

200

Describe Your Job
Describe the job or list the skills you're looking for.

Name Your Job
205

Describe It    Need help? Browse our Job Templates. — 245

210

215 — Add Attachment

Select the Category of Work
220 — - Select Category -

Request Specific Skills or Groups (optional)

225 — Select a category first in the section above.

Select a Category First

230 — What is the work arrangement?
⦿ Hourly    ○ Fixed Price

Part Time  | Enter # | hrs/week  for  | 3-4 weeks |

What is your budget?
235 — - Select -

240 — Privacy and Other Options - Show ⌄

250 — Continue    Save & Post Later — 255

Fig. 2A

Name Your Job
205 — Web Developer

Select the Category of Work
220a — IT & Programming    Web Programming — 220b

Request Specific Skills or Groups (optional)

225a —
Enter the skills you are looking for in a contractor.
.NET
ABAP
Acrobat
Action Script
Active Directory

Selected Skills (max5) — 225b
CSS [x]
HTML [x]
Javascript [x]
PHP [x]

250 — Continue    Save & Post Later — 255

Fig. 2B

SYSTEM FOR ASSISTING CREATION OF MESSAGES BY AUTOMATICALLY RECOMMENDING DATA TO BE INCLUDED THEREIN

FIELD OF THE INVENTION

The present invention relates to an improved system for assisting creation of messages, which automatically recommends data to be included therein.

BACKGROUND OF THE INVENTION

Users today are able to utilize applications that provide them with forms to complete for creating posts, such as job posts. These applications, however, provide only a single form for employers to fill out, regardless of the type of job it is. There are drawbacks to this prior art one-form-fits-all model. First, the prior art form is simply a generic form. It typically has a single field for an employer to describe details of a job. Since the job description field is a general field, which does not provide the employer with any guidance on how to complete the field, the employer may not know how to effectively describe the job, may inadvertently fail to describe certain details of the job that may be crucial to an employee when searching and applying for jobs, or both. Sometimes the failure to provide aspects of the job will result in the job posting being returned at a bottom of a search return list, if it is returned at all. For example, employers oftentimes forget to provide skills, even though these skills are used for matching prospective jobs with employees during a job search. If the employer fails to include a skill that an employee bases the search on, then the job post may not be returned as part of the search return list.

The present invention addresses at least these limitations in the prior art.

SUMMARY OF THE INVENTION

Embodiments of the present invention are directed to a system for assisting creation of messages, by automatically recommending data to be included therein. The system includes an application configured to accept a set of user inputs of a first classification to determine and provide a group of suggested data relevant to the set of user inputs of the first classification. The group of data is chosen from an evolving collection of data of a second classification. The user is able to select any or all from the group of suggested data to adopt as the user's own and/or to provide additional or different data, which are of the second classification. The user inputs and the user's selection(s) are values collected for use in subsequent determinations. The system can be implemented for job post creation, wherein the recommendation feature of the present invention advantageously helps users post better, more-detailed descriptions of jobs faster than before.

In one aspect, a system includes a processor and an application executed by the processor. The application configured to compare one or more current inputs with at least one past input in a first collection to determine statistics for at least one past output in a second collection, and suggest a subset of the past outputs based on the statistics.

In some embodiments, the application is also configured to render a user interface to receive the one or more current inputs. The user interface can be command language based, direct manipulation, or a combination thereof.

In some embodiments, the application is also configured to accept one or more current outputs associated with the current input. The one or more current outputs are able to become part of the second collection for subsequent statistical determinations. At least a portion of the one or more current outputs is the same as and/or is different from at least a portion of the subset of past outputs.

In some embodiments, the one or more current inputs become part of the first collection for subsequent comparisons.

In some embodiments, the first collection relates to at least one of a job title and a job category, and the second collection relates to skills.

In some embodiments, the system also includes at least one data store accessible by the application and configured to store the first collection and the second collection.

In another aspect, a non-transitory computer-readable medium storing instructions that, when executed by a computing device, cause the computing device to perform a method. The method includes accepting at least one user input and applying a machine learning algorithm on the at least one user input to determine a group of one or more suggested outputs.

In some embodiments, the machine learning algorithm is configured to calculate the probability of each output occurring given the at least one user input and ranking outputs based on the calculation.

The method also includes displaying the group of one or more suggested outputs. In some embodiments, the group of one or more suggested outputs is determined based on the rankings.

In some embodiments, the at least one user input relates to at least one of a job title and a job category, and wherein the group of one or more suggested outputs relates to skills.

In yet another aspect, a non-transitory computer-readable medium stores instructions that, when executed by a computing device, cause the computing device to perform a method. The method includes presenting an application to obtain a first group of data, using a machine learning algorithm on the first group of data to suggest a second group of data, and receiving a third group of data.

In some embodiments, each datum in the second group of data is selected from an evolving collection of data.

In some embodiments, the first group of data and the third group of data are used in subsequent suggestion.

In some embodiments, the third group of data includes at least one datum from the second group of data. Alternatively or in addition to, the third group of data does not include any datum from the second group of data.

In some embodiments, the first group of data and the third group of data become part of message, such as a job post, rendered by the application.

In some embodiments, each datum in the second group of data is a datum likely chosen in other messages similar to the message.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

FIG. 2A illustrates a job post form based on an exemplary default template in accordance with the present invention.

FIG. 2B illustrates portions of the job post form of FIG. 2A.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein or with equivalent alternatives.

Embodiments of the present invention are directed to a system for assisting creation of messages, by automatically recommending data to be included therein. The system includes an application configured to accept a set of user inputs of a first classification to determine and provide a group of suggested data relevant to the set of user inputs of the first classification. The group of data is chosen from an evolving collection of data of a second classification. The user is able to select any or all from the group of suggested data to adopt as the user's own and/or to provide additional or different data, which are of the second classification. The user inputs and the user's selection(s) are values collected for use in subsequent determinations. The system can be implemented for job post creation, wherein the recommendation feature of the present invention advantageously helps users post better, more-detailed descriptions of jobs faster than before. Although the invention herein is described relative to job posts, the invention can be applied to other types of messages and/or other types of user interfaces capable of receiving user inputs. For example, a user interface can be command language based, direct manipulation based, or a combination thereof.

Figure 1:
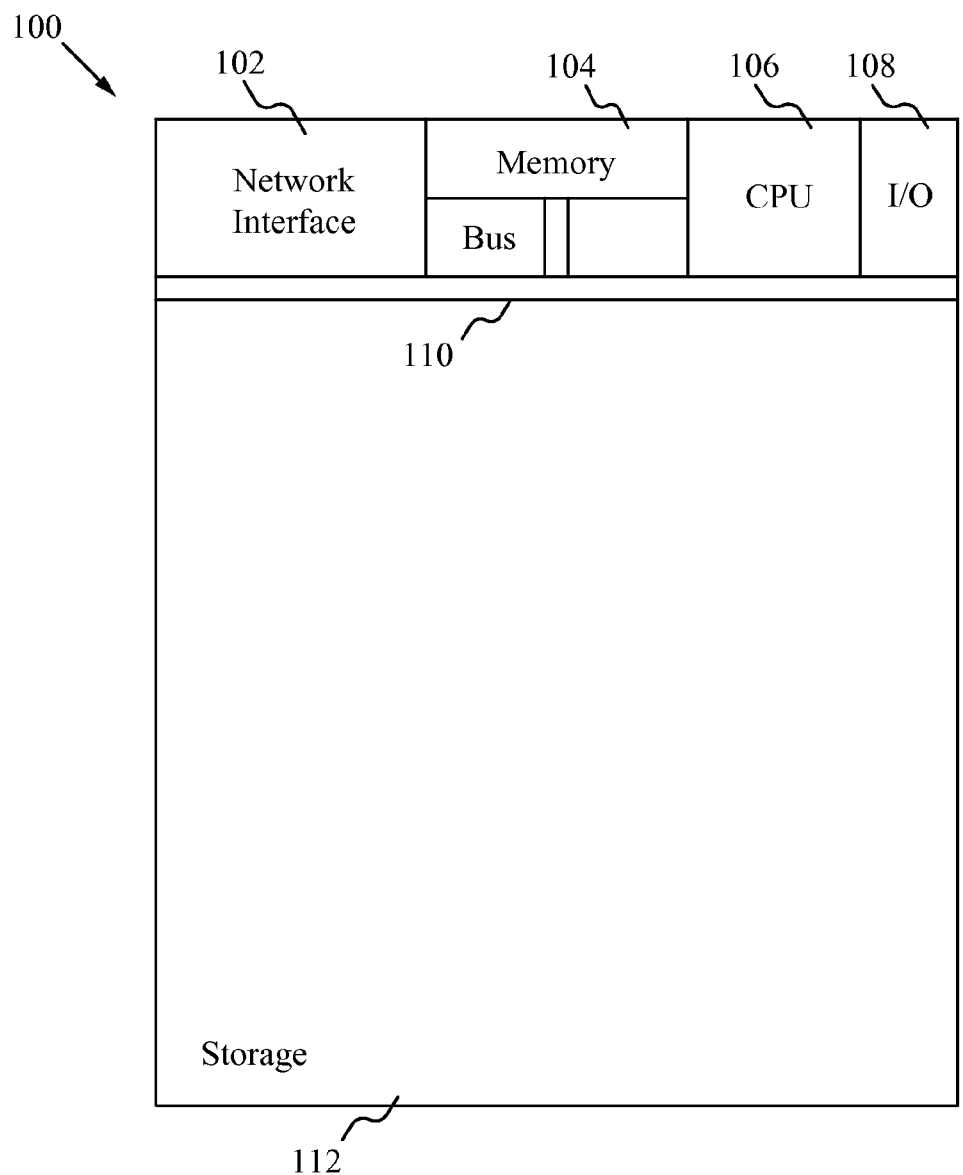
FIG. 1 illustrates a graphical representation of an exemplary computing device in accordance with the present invention.

FIG. 1 illustrates a graphical representation of an exemplary computing device 100 in accordance with the present invention. The computing device 100 is able to serve, compute, communicate, generate and/or display job posts created by employers. For example, a computing device 100 is able to host a website which stores and serves information related to jobs.

In general, a hardware structure suitable for implementing the computing device 500 includes a network interface 102, a memory 104, processor 106, I/O device(s) 108, a bus 110 and a storage device 112. The choice of processor is not critical as long as the processor 106 has sufficient speed. The memory 104 is any conventional computer memory known in the art. The storage device 112 is a hard drive, CDROM, CDRW, DVD, DVDRW, flash memory card or any other storage device. The computing device is able to include one or more network interfaces 102. An example of a network interface includes a network card connected to an Ethernet or other type of LAN. The I/O device(s) 108 are able to include one or more of the following: keyboard, mouse, monitor, display, printer, modem and other devices. Software applications are likely to be stored in the storage device 112 and memory 104 and are executed by the processor 106. Software applications include an application configured to assist in creation of a message, such as a job post.

Examples of suitable computing devices include a personal computer, laptop computer, computer workstation, a server, mainframe computer, mini-computer, handheld computer, personal digital assistant, cellular/mobile telephone, smart appliance, gaming console or any other suitable computing device. If there is a set of servers, they can be co-located or geographically dispersed.

A job post form of the present invention is based on one of a plurality of templates, including a default template and one or more alternate templates. In some embodiments, the job post form is accessible on a web page of a browser on an Internet-ready client device. In addition to or alternatively, the job post form is accessed using a native application running on an Internet-ready client device. Switching between templates and selecting a template are discussed in the co-pending U.S. application Ser. No. 13/652,357, entitled "A SYSTEM FOR ASSISTING CREATION OF A MESSAGE BY PROVIDING SELECTABLE TEMPLATES," which is hereby incorporated by reference in its entirety.

FIG. 2A illustrates a job post form based on an exemplary default template 200 in accordance with the present invention. The job post form based on the default template 200 includes a plurality of fields that aids the employer in describing a job. The fields include a job title field 205, a generic description field 210, a job category field 220, a skills field 225, a work arrangement field 230, a budget field 235. The job post form 200 also has a file attachment feature 215, a privacy and other options feature 240 and an alternate templates link 245.

The job title field 205 allows the employer to name the job. The generic description field 210 allows the employer to describe the job. The job category field 220 typically includes a selector that allows the employer to categorize the job. In some embodiments, after the employer selects a category of work using a job category selector, the employer is able to select a sub-category to further define or classify the job. In some embodiments, a list of suggested skills is automatically listed upon the employer selecting a category and a sub-category. In some embodiments, the list of suggested skills pertains to values associated with the title, the category, the sub-category, or a combination thereof, which are provided by the employer. As further discussed below, the list of suggested skills is determined using a machine learning algorithm. The employer is able to keep some or all of the suggested skills to be included as part of the final job post. Alternatively or in addition to, the employer is able to provide additional skills that are different from those suggested. In some embodiments, the user can only include a maximum number of skills as part of the job post and/or the user must include a minimum number of skills as part of the job post. Alternatively, the skills field 225 is simply an optional field.

It should be understood that the fields are not limited to those shown in FIG. 2A (e.g., the job title field 205, the generic description field 210, the job category field 220, the skills field 225, the work arrangement field 230 and the budget field 235) but can include other fields. After the employer has completed filling out the job post form, the employer has the option to continue with the posting of the job via button 250 or the option to save the job post form for a later posting via button 255. If the employer activates button 250, the job post is subsequently published, for example on the Internet, and made available for searching and viewing by those looking for jobs, such as an employee. In some embodiments, the employer is able to first review and make changes to the job post before it is published. If the employer activates button 255, data associated with the fields are saved in and are retrievable from a datastore when the employer returns to the job post form.

In some embodiments, certain fields are automatically pre-populated with editable content. Pre-population or auto-fill can be based on one of several techniques. The first technique is auto-filling based on a simple computation. For example, if a user provides data for a start date field, an end date field can be automatically be pre-populated with a value based on a simple computation, such as adding five days to the start date.

The second technique is auto-filling based on a filter. For example, if the employer intends to enter "Web Programming" in the job title field 205 and begins typing the first letter "W," a matching list of stored values that begin with the letter "W" will be presented to the employer. As the employer continues typing, the matching list starts to narrow down. The employer is able to simply select "Web Programming" from the matching list when it appears in the matching list, instead of typing out the phrase.

The third technique is auto-filling based on a machine learning algorithm. The machine learning algorithm typically determines a group of one or more data based on what the user has entered. The group of one or more data is selected from an evolving collection of past data collected from all users. In other words, the machine learning algorithm learns from user behavior and is able to make a recommendation based on the data that a user has entered.

For example, referring now to FIG. 2B, which illustrates portions of the job post form of FIG. 2A, assume the employer has entered "Web Developer" as an input in the job title field 205, has selected "IT & Programming" using the job category selector 220a, and has selected "Web Programming" using the job sub-category selector 220b. In some embodiments, after using the job category selector 220a, a list of potentially relevant skills is first shown in a first skills field 225a. In some embodiments, after using the job category selector 220a and the job sub-category selector 220b, a machine learning algorithm chooses one or more suggested skills, which are then populated in a second skills field 225b. In some embodiments, the one or more suggested skills are a subset of the list of potentially relevant skills.

The machine learning algorithm typically learns from an evolving repository of previous job postings to determine which skills are typically chosen in similar job postings. In some embodiments, the machine learning algorithm makes a determination based on the values associated with the job title, the job category, the sub-category, or a combination thereof. The determination can be based on other values associated with other fields. Although the suggested skills are automatically populated in the second skills field 225b, a suggested skill can be removed by activating the corresponding [x] or the like. The employer is able to include additional skills in the second skills field 225b. The additional skills can be selected from the first skills field 225a or entered by the employer. The skills in the second skills field 225b eventually become part of the job post. The machine learning algorithm is typically configured to learn from this current job post in making subsequent or future recommendations.

Figure 3:
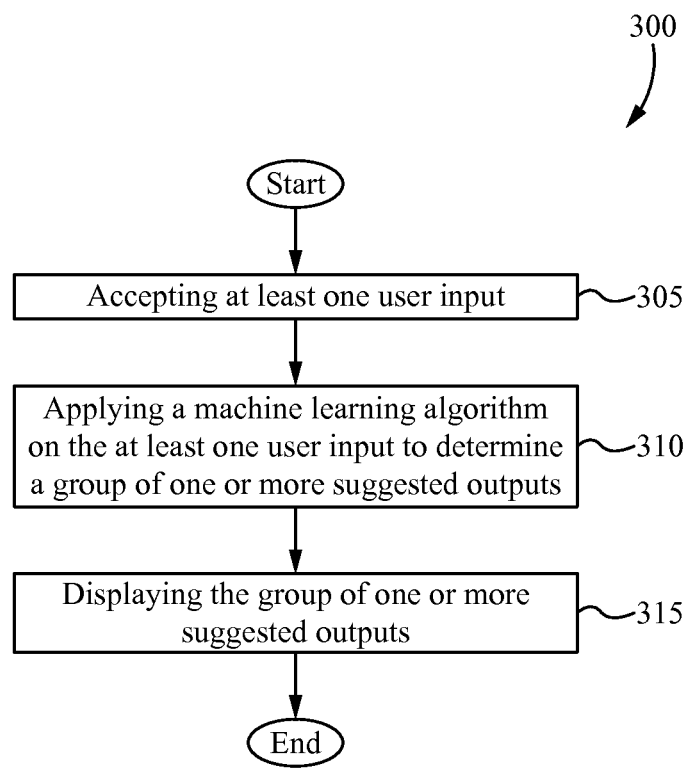
FIG. 3 illustrates an exemplary method 300 of suggesting a group of data in accordance with the present invention.

FIG. 3 illustrates an exemplary method 300 of suggesting a group of data in accordance with the present invention. The method 300 begins at a step 305, where at least one user input is accepted via a user interface. In some embodiments, the at least one user input includes user input associated with a job title, user input associated with a job category, user input associated with a job sub-category, or a combination thereof. The at least one user input can include other values. In some embodiments, the user interface is command language based, direct manipulation based, or a combination thereof.

At a step 310, a machine learning algorithm is applied on the at least one user input to determine a group of one or more suggested outputs. Typically, the one or more suggested outputs are related to the at least one user input. In some embodiments, the one or more suggested outputs include skills. In some embodiments, the machine learning algorithm learns from an evolving repository of previous data, such as previous job posts, to determine the group of one or more suggested outputs. In some embodiments, the machine learning algorithm calculates the probability of each output occurring given the at least one user input, and ranks the outputs based on the calculation. The group of one or more suggested outputs is determined based on the rankings.

At a step 315, the group of one or more suggested outputs is displayed. In some embodiments, three outputs are suggested. More or less outputs can be suggested. After the step 315, the method 300 ends.

In operation, the employer activates an application to create a new job post. A job post form is presented to the employer. Some fields of the form are automatically filled in with pre-populated content based on other fields already completed by the employer. For example, after the employer completes a job title field and a job category field, a skills field is pre-populated with suggested skills determined by using a machine learning algorithm. The machine learning algorithm compares these user inputs with all previous data stored in an evolving data store to determine the probability of a skill existing when the user inputs exist. Put differently, the machine learning algorithm learns from the evolving data store of previous job postings to determine which skills are typically chosen in similar job postings. Based on these probabilities, the skills are ranked. The suggested skills are typically the highest ranked. The employer is able to remove one or more of the suggested skills, and is able to include one or more of the suggested skills as part of the employer's job post. The employer's job post will typically be used by the machine learning algorithm in subsequent suggestions.

The evolving data store is constantly changing and could at one time suggest skills differently from that of another time, for the same user inputs. Assume that Foo is a programming language that has been popular within the past year. In other words, Foo is frequently associated with user inputs similar to that of the employer's. The machine learning algorithm learns that from previous job posts and suggests Foo to the employer. However, if Foo is no longer used the following year, the machine learning algorithm would not suggest Foo for the same user inputs the following year.

Although the user interface illustrated in the figures are shown as command language based (e.g., having fields) for accepting user input, the user interface can also or instead be direct manipulation based (e.g., having selectable icons or objects) for accepting user input. Other user input forms, such as gestures or handwriting, are contemplated.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A system comprising:
   a processor; and
   an application executed by the processor, the application configured to:
   receive one or more current inputs that correspond to a first collection;
   compare the one or more current inputs with past inputs corresponding to the first collection that are stored in a repository;
   determine probabilities for past outputs corresponding to a second collection that are also stored in the repository;
   generate a ranked subset of the past outputs based on the probabilities and prepopulate an input field, wherein the subset is modifiable by deleting at least one past output from the subset upon a user explicitly removing the at least one past output from the subset; and store the one or more current inputs along with the subset in an evolving collection of past data collected from all users; and use the subset to generate a message.

2. The system of claim 1, wherein the application is also configured to render a user interface to receive the one or more current inputs.

3. The system of claim 2, wherein the user interface is command language based.

4. The system of claim 2, wherein the user interface is direct manipulation.

5. The system of claim 1, wherein the application is also configured to accept one or more current outputs associated with the current input.

6. The system of claim 5, wherein the one or more current outputs become part of the second collection for subsequent statistical determinations.

7. The system of claim 5, wherein at least a portion of the one or more current outputs is the same as at least a portion of the subset of past outputs.

8. The system of claim 5, wherein at least a portion of the one or more current outputs is different from at least a portion of the subset of past outputs.

9. The system of claim 1, wherein the one or more current inputs become part of the first collection for subsequent comparisons.

10. The system of claim 1, wherein the first collection relates to at least one of a job title and a job category, and wherein the second collection relates to skills.

11. The system of claim 1, further comprising at least one data store accessible by the application and configured to store the first collection and the second collection.

12. A non-transitory computer-readable medium storing instructions that, when executed by a computing device, cause the computing device to perform a method comprising:

accepting two user inputs for a first field and a second field;

displaying relevant selections related to the first field;

applying a machine learning algorithm on the two user inputs to determine a ranked group of one or more suggested outputs for a third field; and prepopulating the third field with the group of one or more suggested outputs, wherein the group is modifiable by removing at least one of the one or more suggested outputs from the third field according to subsequent user input;

store the one or more current inputs along with the selected group in an evolving collection of past data collected from all users; and use the selected group to generate a message.

13. The non-transitory computer-readable medium of claim 12, wherein the machine learning algorithm is configured to:

calculate the probability of each output occurring given the two user inputs; and ranking outputs based on the calculation.

14. The non-transitory computer-readable medium of claim 13, wherein the group of one or more suggested outputs is determined based on rankings.

15. The non-transitory computer-readable medium of claim 12, wherein the two user inputs relate to a job sub-category and a job category, and wherein the group of one or more suggested outputs relates to skills.

16. A non-transitory computer-readable medium storing instructions that, when executed by a computing device, cause the computing device to perform a method comprising:

switching from a first template to a second template, wherein the second template is configured to obtain a first group of data;

using a machine learning algorithm on the first group of data to suggest a second group of ranked data, prepopulating an input field with the group of one or more suggested outputs, wherein the group is modifiable by removing at least one of the one or more suggested outputs from the third field according to the user input;

storing the one or more current inputs along with the selected group in an evolving collection of past data collected from all users; and using the selected group to generate a message.

17. The non-transitory computer-readable medium of claim 16, wherein each datum in the second group of data is selected from an evolving collection of data.

18. The non-transitory computer-readable medium of claim 16, wherein the first group of data and the third group of data are used in subsequent suggestion.

19. The non-transitory computer-readable medium of claim 16, wherein the third group of data includes at least one datum from the second group of data.

20. The non-transitory computer-readable medium of claim 16, wherein the third group of data does not include any datum from the second group of data.

21. The non-transitory computer-readable medium of claim 16, wherein the first group of data and the third group of data become part of message.

22. The non-transitory computer-readable medium of claim 21, wherein each datum in the second group of data is a datum likely chosen in other messages similar to the message.

* * * * *